US010521832B2

(12) United States Patent
Zhu et al.

(10) Patent No.: US 10,521,832 B2
(45) Date of Patent: Dec. 31, 2019

(54) SYSTEMS AND METHODS FOR SUGGESTING CREATIVE TYPES FOR ONLINE CONTENT ITEMS TO AN ADVERTISER

(71) Applicants: Google Inc., Mountain View, CA (US); Yongtai Zhu, Santa Clara, CA (US); Tara Ding, Shanghai (CN); Bassem Elkarablieh, Kirkland, WA (US)

(72) Inventors: Yongtai Zhu, Santa Clara, CA (US); Tara Ding, Shanghai (CN); Bassem Elkarablieh, Kirkland, WA (US)

(73) Assignee: Google LLC, Mountain View, CA (US)

(*) Notice: Subject to any disclaimer, the term of this patent is extended or adjusted under 35 U.S.C. 154(b) by 58 days.

(21) Appl. No.: 15/321,652

(22) PCT Filed: Jul. 1, 2014

(86) PCT No.: PCT/CN2014/081401
§ 371 (c)(1),
(2) Date: Dec. 22, 2016

(87) PCT Pub. No.: WO2016/000212
PCT Pub. Date: Jan. 7, 2016

(65) Prior Publication Data
US 2017/0161794 A1 Jun. 8, 2017

(51) Int. Cl.
G06Q 30/00 (2012.01)
G06Q 30/02 (2012.01)
G06N 20/00 (2019.01)

(52) U.S. Cl.
CPC ......... G06Q 30/0277 (2013.01); G06N 20/00 (2019.01); G06Q 30/00 (2013.01); G06Q 30/02 (2013.01); G06Q 30/0276 (2013.01)

(58) Field of Classification Search
CPC .... G06Q 30/0277; G06Q 30/00; G06Q 30/02; G06N 20/00
(Continued)

(56) References Cited

U.S. PATENT DOCUMENTS 7,406,434 B1 * 7/2008 Chang .............. G06Q 10/06375
705/14.43
8,121,893 B1 * 2/2012 Krikheli ................. G06Q 30/02
705/14.1
(Continued)

FOREIGN PATENT DOCUMENTS

CN 1211771 3/1999

OTHER PUBLICATIONS

International Search Report and Written Opinion on PCT/CN2014/081401 dated Apr. 3, 2015 (8 pages).
(Continued)

Primary Examiner — Luis A Brown
(74) Attorney, Agent, or Firm — Foley & Lardner LLP

(57) ABSTRACT

A computer-implemented method for generating creative type suggestions for an online content provider is provided. The method uses a computing device including a processor and a memory. The method includes training a first model with historical information including one or more of (i) serving performance of online advertisements and (ii) advertiser information. The method also includes computing a preliminary creative type suggestion using at least the first model. The method further includes modifying the preliminary creative type suggestion based at least in part on past suggestion performance to generate a final creative type suggestion. The method also includes presenting the final creative type suggestion to the online content provider.

18 Claims, 5 Drawing Sheets

(58) Field of Classification Search
USPC .......... 705/14.72, 14.73, 14.43, 14.52, 14.4
See application file for complete search history.

(56) References Cited

U.S. PATENT DOCUMENTS

| | | | | |
|---|---|---|---|---|
| 8,175,914 | B1* | 5/2012 | Benson | G06Q 10/025 705/14.41 |
| 9,224,100 | B1* | 12/2015 | Chatterjee | G06Q 30/0241 |
| 9,633,378 | B1* | 4/2017 | Nath | G06Q 30/0277 |
| 9,865,004 | B1* | 1/2018 | Snoddy | G06Q 30/0244 |
| 2004/0204983 | A1* | 10/2004 | Shen | G06Q 10/10 705/14.43 |
| 2006/0041480 | A1* | 2/2006 | Briggs | G06Q 30/02 705/14.41 |
| 2006/0242013 | A1* | 10/2006 | Agarwal | G06Q 30/02 705/14.49 |
| 2007/0271145 | A1* | 11/2007 | Vest | G06Q 30/02 705/14.41 |
| 2009/0063250 | A1* | 3/2009 | Burgess | G06Q 30/02 705/14.52 |
| 2009/0063268 | A1* | 3/2009 | Burgess | G06Q 30/02 705/14.39 |
| 2009/0287572 | A1* | 11/2009 | Whelan | G06Q 30/02 705/14.55 |
| 2010/0070288 | A1* | 3/2010 | Pandey | G06Q 30/02 705/14.72 |
| 2010/0082441 | A1* | 4/2010 | Doemling | G06Q 30/02 705/14.72 |
| 2011/0010239 | A1* | 1/2011 | Vijay | G06Q 30/02 705/14.42 |
| 2011/0015990 | A1* | 1/2011 | Sanghavi | G06Q 10/087 705/14.43 |
| 2011/0137737 | A1* | 6/2011 | Baird | G06Q 30/0272 705/14.73 |
| 2011/0191190 | A1* | 8/2011 | Heller | G06Q 30/02 705/14.68 |
| 2012/0109741 | A1* | 5/2012 | Ballapragada | G06Q 30/0244 705/14.43 |
| 2013/0226691 | A1* | 8/2013 | Chatow | G06Q 30/02 705/14.42 |
| 2014/0156416 | A1* | 6/2014 | Goenka | G06Q 30/0276 705/14.66 |
| 2014/0244405 | A1* | 8/2014 | Cohen | G06Q 30/0276 705/14.72 |
| 2014/0258001 | A1* | 9/2014 | Ramaksrihnan | G06Q 30/0276 705/14.72 |
| 2015/0088634 | A1* | 3/2015 | Greenzeiger | G06Q 30/0244 705/14.43 |
| 2015/0220971 | A1* | 8/2015 | Raj | G06Q 30/0244 705/14.43 |
| 2015/0332313 | A1* | 11/2015 | Slotwiner | G06Q 30/0245 705/14.44 |
| 2015/0348141 | A1* | 12/2015 | Parker | G06F 16/9577 705/14.73 |
| 2017/0161794 | A1* | 6/2017 | Zhu | G06Q 30/02 |

OTHER PUBLICATIONS

The Korean Intellectual Property Office Notice of Office Action for application No. 10-2016-7037104 dated Mar. 20, 2018.
Communication regarding Extended Search Report and supplementary European Search Report for EP 14896318.4 dated Oct. 10, 2017. (7 pages).
Decision of Rejection for KR Application No. 10-2016-7037104 dated Feb. 27, 2019.
Decision of Rejection for KR Application No. 10-2016-7037104 dated Nov. 26, 2018.

* cited by examiner

SYSTEMS AND METHODS FOR SUGGESTING CREATIVE TYPES FOR ONLINE CONTENT ITEMS TO AN ADVERTISER

This application is a U.S. National Stage of International Application No. PCT/CN2014/081401, titled "SYSTEMS AND METHODS FOR SUGGESTING CREATIVE TYPES FOR ONLINE CONTENT ITEMS TO AN ADVERTISER" filed on Jul. 1, 2014, contents of which are incorporated herein.

BACKGROUND

This specification relates to online content presentation and, more particularly, to a system and method for suggesting creative types of online content items to online content providers.

In online forums such as the Internet, online content providers (e.g., advertisers) create online content items (e.g., advertisements) that are served to online consumers as they traverse the Internet. There are many known formats, or "creative types", for online content items, and creative types continue to evolve. Some known creative types include text ads, image ads, animated ads, and video ads. Some creative types are tailored toward particular media types or forums. For example, the creative types of HTML5, interstitial ads, and click-to-call ads cater to mobile devices such as tablet and smartphone devices.

The increasing number of ad types makes the process of ad creation more complex for advertisers. Not only must an advertiser figure out the ad design that will best attract consumers, but they must also determine the best ad type for their business. In many cases, advertisers may not even be aware of what creative types are available, let alone which may be most effective for their purposes. Many potential online advertisers may be discouraged by the ad creative process and may abandon the process in the face of these hurdles. Other online advertisers may continue to use dated or less effective creative types merely because they are most familiar with a certain subset of creative types.

BRIEF DESCRIPTION OF THE DISCLOSURE

In one aspect, a computer-implemented method for generating creative type suggestions for an online content provider is provided. The method uses a computing device including a processor and a memory. The method includes training a first model with historical information including one or more of (i) serving performance of online advertisements and (ii) advertiser information. The method also includes computing a preliminary creative type suggestion using at least the first model. The method further includes modifying the preliminary creative type suggestion based at least in part on past suggestion performance to generate a final creative type suggestion. The method also includes presenting the final creative type suggestion to the online content provider.

In another aspect, a computer system is provided. The computer system includes an output device, at least one memory, and one or more processors. The one or more processors are configured to train a first model with historical information including one or more of (i) serving performance of online advertisements and (2) advertiser information. The one or more processors are also configured to compute a preliminary creative type suggestion for an online content provider using at least the first model. The one or more processors are further configured to modify the preliminary creative type suggestion based at least in part on past suggestion performance to generate a final creative type suggestion. The one or more processors are also configured to present the final creative type suggestion to the online content provider.

In yet another aspect, non-transitory computer-readable storage media having computer-executable instructions embodied thereon are provided. When executed by at least one processor, the computer-executable instructions cause the processor to train a first model with historical information including one or more of (i) serving performance of online advertisements and (ii) advertiser information. The computer-executable instructions also cause the processor to compute a preliminary creative type suggestion for an online content provider using at least the first model. The computer-executable instructions further cause the processor to modify the preliminary creative type suggestion based at least in part on past suggestion performance to generate a final creative type suggestion. The computer-executable instructions also cause the processor to present the final creative type suggestion to the online content provider.

BRIEF DESCRIPTION OF THE DRAWINGS

FIG. 1 is a diagram showing an example networked environment for suggesting creative types of online content items to content providers.

FIG. 2 is a block diagram of a computing device used for suggesting creative types to a user as shown in FIG. 1.

FIG. 3 is a diagram of an example suggestion system for providing creative type suggestions to a content provider.

FIG. 4 is an example method for suggesting creative types for online content items to an advertiser.

FIG. 5 shows an example configuration of a database within a computing device, along with other related computing components, that may be used to suggest creative types for online content items to an advertiser.

Like reference numbers and designations in the various drawings indicate like elements.

DETAILED DESCRIPTION OF THE DISCLOSURE

Figure 1:
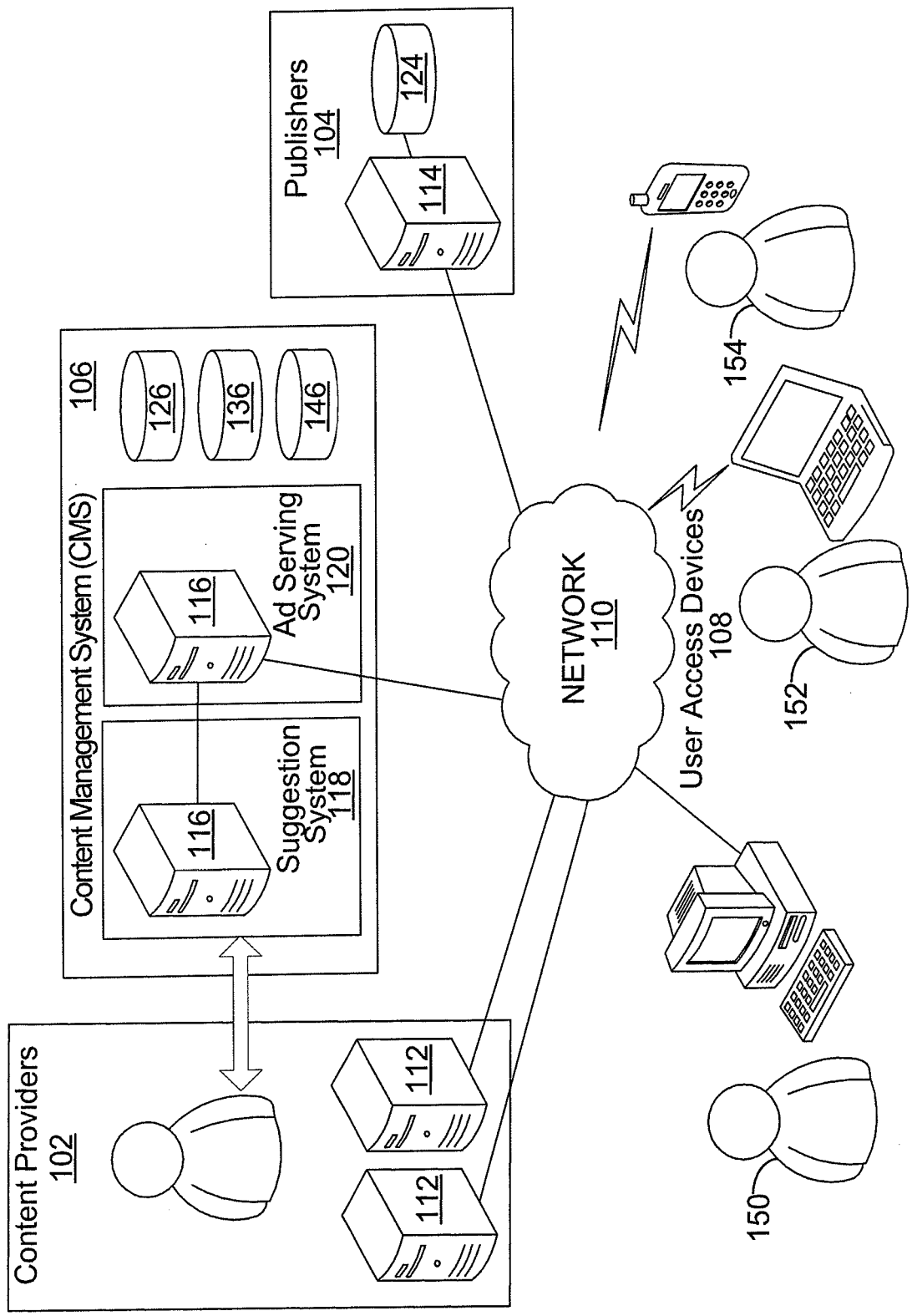
FIGS. 1-5 show example embodiments of the methods and systems described herein.

Embodiments of the methods and systems described herein enable suggestion of ad types ("creative types") for providers of online content (e.g., online advertisers). When creating online content (e.g., ads), some advertisers may not be aware of certain creative types, and thus may avoid some types that may be advantageous or that may outperform the creative types for which they are comfortable. As used herein, the term "creative type" refers to an underlying format of an ad that dictates how the ad is constructed and displayed to users, such as a static image, custom HTML, interstitial, or rich media.

This creative type suggestion system analyzes historical data from other advertisers ("historical advertisers") and, more particularly, the performance of the creative types for past advertisements (i.e., past impressions) to prepare a suggestion list of creative types for a "current advertiser." The system creates (a) advertiser profiles for a pool of historical advertisers, one profile for each advertiser, and (b) serving performance data of past advertising campaigns associated with the historical advertisers. The advertiser profiles are generated from a combination of (1) the advertiser's advertising history (e.g., the particular creative types used, spending amounts, cost types, and placements) and (2) the advertiser's site information (e.g., business vertical(s) of the advertiser and advertising assets). The historical serving performance data identifies how each creative performed for that particular advertiser. The profile data and the serving performance data are used to train a learning model ("creative type model") that can generate creative type suggestions for a current advertiser.

Using the creative type model, the suggestion system generates an ordered list of suggested creative types for the current advertiser. The system generates this list from three factors, a frequency of "used type" factor, a performance factor, and a predefined type factor. The system uses a profile of the current advertiser as input to the model to generate the frequency of used type factor and the performance factor tailored to the current advertiser. These two factors thereby incorporate how often past advertisers (of similar profile) used certain creative types, as well as how well those creative types performed. The third factor is a human-defined factor representing what analysts would suggest to the current advertiser. These three factors are weighted together to generate the ordered list of suggested creative types for the current advertiser.

This list of suggested creative types is then modified based on the performance of past suggestions. In order to perform this modification step, the system builds and maintains (i.e., regularly re-trains) a "suggestions performance model" that analyzes how past advertisers acted given the system's suggestions. This suggestions performance model incorporates both the profile of the past advertisers, as well as the "save ratio" (i.e., whether the given suggested creative type was actually implemented by the past suggested-advertiser). As such, the suggestion system uses the suggestions performance model (i.e., the performance of past suggestions) to modify the current list of suggested creative types before presentation to the target advertiser.

The methods and systems described herein may be implemented using computer programming or engineering techniques including computer software, firmware, hardware, or any combination or subset thereof, wherein the technical effects may be achieved by performing at least one of the following steps: (a) training a first model with historical information including one or more of serving performance of online advertisers and advertiser information; (b) computing a preliminary creative type suggestion using at least the first model; (c) modifying the preliminary creative type suggestion based at least in part on past suggestion performance to generate a final creative type suggestion; (d) presenting the final creative type suggestion to the online advertiser; (e) generating, using the model, one or more of a frequency of use factor and a performance factor associated with creative types; (f) weighting two or more of a frequency of use factor, a performance factor, and a predefined type suggestion to generate the preliminary creative type suggestion; (g) modifying the suggestion values; (h) training a second model with the past suggestion performance including one or more of creative type suggestion performance data and advertiser information, wherein modifying the preliminary creative type suggestion includes modifying the preliminary creative type suggestion based at least in part on output from the second model; (i) training the second model with the plurality of advertiser profiles; and (j) generating an advertiser profile for each historical advertiser from a plurality of historical advertisers, thereby generating a plurality of advertiser profiles, wherein training a first model with historical information includes training the first model with at least the plurality of advertiser profiles.

In some known systems, the advertiser may continue to leverage known creative types because they are unaware of the availability, suitability, or performance benefits of other creative types. This suggestion system assists advertisers in adopting creative types in their advertising campaigns by providing appropriate creative type suggestions. Overall technical effects of this suggestions system include one or more of providing suggestions that are likely to be adopted by advertisers, providing suggestions that provide enhanced performance with similar advertisers, and adapting suggestions based on past suggestion results.

The following detailed description illustrates embodiments of the disclosure by way of example and not by way of limitation. It is contemplated that the disclosure has general application to the presentation of content items such as online advertisements during presentation of online content items.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

FIG. 1 is a diagram showing an example networked environment 100 for suggesting creative types of online content items to content providers 102. With reference to FIG. 1, the example networked environment 100 may include one or more content providers 102 (alternatively referred to herein as merchants or advertisers), one or more publishers 104, a content management system (CMS) 106, and one or more user access devices 108 ("client computing devices" or just "client devices"), which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with servers, software processes and engines, and/or various embedded systems. The elements 102, 104, 106 and 110 may serve, for example, as a content bidding and/or distribution network. In the example embodiment, content providers 102 include online advertisers, and CMS 106 is an advertising management system that enables suggestion of creative types for content items to content providers 102 via a suggestion system 118.

The content providers 102 may include any entities that are associated with content (i.e., a content item or multiple content items). In some embodiments, the content includes any form of communication in which one or more products, services, ideas, messages, people, organizations or other items are identified and promoted (or otherwise communicated). Content is not limited to advertisements and commercial promotions. Rather, content may include public service announcements or any other types of notices, such as public notices published in printed or electronic press or broadcasts. In some embodiments, content providers 102 provide content items that include, for example, audio and/or video advertisements.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression, also referred to herein as an advertisement, or "ad." A content impression refers to any form of presentation of content such that it is viewable/receivable by a user. In some examples, a content impression may occur when content is displayed on a display device of a user access device (i.e., a "client computing device"). A content group refers, for example, to an entity that represents a group of creatives that share a common characteristic, such as having the same content selection and recommendation criteria. Content groups can be used to create a content campaign.

In some embodiments, one or more ads are affiliated with an "ad group." An ad group includes one or more ads along with other associated information related to those ads, such as, for example and without limitation, a title, a headline, a budget, targeting criteria, and keywords. In the example embodiment, an ad group includes one ad and associated information. As used herein, the term "ad" and "ad group" may be used interchangeably, as some operations that are performed relative to an ad may also be performed relative to an ad group, and vice versa.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, review, and/or analyze content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems. In some embodiment, some content providers 102 review online content items using, for example, systems 112 and/or CMS 106.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. The relevant content may be provided from the CMS 106 and may be combined with a publication for display to users 150, 152, and 154. In some examples, the publishers 104 may retrieve a publication for display on a particular user access device 108 and then forward the publication to the user access device 108 along with code that causes content from the CMS 106 to be displayed to the user 150, 152, or 154. In other examples, the publishers 104 may retrieve a publication, retrieve relevant content (e.g., from the CMS 106 or the content providers 102), and then integrate the content and the publication to form a page for display to the user 150, 152, or 154. In still other examples, the publishers 104 may provide online content space for sale to advertisers, such as content providers 102. Such content space may be populated with content items from the content providers 102, and may be presented to the user 150, 152, or 154 along with the publications.

As noted above, one or more of the publishers 104 may represent a publication network. In such an implementation, the content providers 102 may be able to present content to users through this publication network. Further, in some embodiments, content providers 102 bid on online content items, for example, through CMS 106.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information. Additionally, in some embodiments, publishers 104 and/or content providers 102 may review online content items using, for example, system 114 and/or CMS 106.

The CMS 106 manages content and provides various services to the content providers 102, the publishers 104, and the user access devices 108. The CMS 106 may store content in a content repository 126 and facilitate the distribution or selective provision and recommendation of content through the environment 100 to the user access devices 108.

The CMS 106 may include one or more data processing systems 116, such as servers or embedded systems, coupled to the network 110. It can also include one or more processes, such as server processes. In some examples, the CMS 106 may include a content serving system 120 and one or more backend processing systems (not separately shown).

The content serving system 120 may include one or more data processing systems 116 and may perform functionality associated with delivering content to publishers or user access devices 108. The backend processing systems may include one or more data processing systems 116 and may perform functionality associated with identifying relevant content to deliver, processing various rules, performing filtering processes, generating reports, maintaining accounts and usage information, auctioning online content items, and other backend system processing. The CMS 106 can use the backend processing systems and the content serving system 120 to selectively recommend and provide relevant content from the content providers 102 through the publishers 104 to the user access devices 108.

The CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query. Searching modules may also store search results including one or more of search query terms, search results elements, and ads impressions served.

The CMS 106 may include one or more interface or frontend modules for providing the various features to content providers, publishers, and user access devices. For example, the CMS 106 may provide one or more publisher front-end interfaces (PFEs) for allowing publishers to interact with the CMS 106. The CMS 106 may also provide one or more content provider front-end interfaces (CPFEs) for allowing content providers to interact with the CMS 106. In some examples, the front-end interfaces may be configured as web applications that provide users with network access to features available in the CMS 106.

The CMS 106 provides various content management features to the content providers 102. The CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, and review content items as described herein.

The CMS 106 may allow the content providers 102 to create content and input keywords for which the content will appear. In some examples, the CMS 106 may provide content to user access devices or publishers when keywords associated with that content are included in a user request or a requested publication. The CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

The CMS 106 may also allow the content providers 102 to view information about content impressions, which may be maintained by the CMS 106. The CMS 106 may be configured to determine and maintain the number of content impressions relative to a particular website or keyword. The CMS 106 may also determine and maintain the number of click-trough's for content as well as the ratio of click-trough's to impressions.

The CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The CMS 106 may store conversion data and other information in a conversion data repository 136.

The CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The CMS 106 may provide various features to the publishers 104. The CMS 106 may deliver content (associated with the content providers 102) to the user access devices 108 when users access publications from the publishers 104. The CMS 106 can be configured to deliver content that is relevant to publisher sites, publications, and publisher audiences.

In some examples, the CMS 106 may crawl publications provided by the publishers 104 and deliver content that is relevant to publisher sites, publications and publisher audiences based on the crawled publications. The CMS 106 may also selectively recommend and/or provide content based on user information and behavior, such as particular search queries performed on a search engine website. In some examples, the CMS 106 can add search to a publisher site and deliver content configured to provide appropriate and relevant content relative to search results generated by requests from visitors of the publisher site. A combination of these and other approaches can be used to deliver relevant content.

The CMS 106 may allow the publishers 104 to search and select specific products and services as well as associated content to be displayed with publications provided by the publishers 104. For example, the publishers 104 may search through content in the content repository 126 and select certain content for display with their publications.

The CMS 106 may be configured to selectively recommend and provide content created by the content providers 102 to the user access devices 108 directly or through the publishers 104. The CMS 106 may selectively recommend and provide content to a particular publisher 104 (as described in further detail herein) or a requesting user access device 108 when a user requests search results or loads a publication from the publisher 104.

In some implementations, the CMS 106 may manage and process financial transactions among and between elements in the environment 100. For example, the CMS 106 may credit accounts associated with the publishers 104 and debit accounts of the content providers 102. These and other transactions may be based on conversion data, impressions information and/or click-through rates received and maintained by the CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

In the example embodiment, the CMS 106 includes a suggestion system 118 that provides creative type suggestions to content providers 102. During operation, and as described in greater detail below, suggestion system 118 accesses and analyzes historical advertiser data 146 for past content providers 102 and the performance of prior advertising campaigns (e.g., how often impressions were served for ads with a given creative type, how often those impressions generated click-through's and/or conversions). Suggestion system 118 learns a creative type model from this historical data, and uses that creative type model to generate a creative type suggestions list for a present content provider 102 (e.g., an advertiser that is working on building a new campaign or a new creative). The present content provider 102 may or may not act on the suggestions provided by suggestion system 118. For example, the content provider may disregard the suggestions and build a new creative with a known creative type previously used by the content provider, or the content provider may adopt one of the creative type suggestions and generate a new creative with a previously-unused creative type. In either case, suggestion system 118 records the decisions made by the current content provider, as well as past decisions made to the suggestions given to past content providers. With this suggestions performance data, suggestion system 118 learns a suggestions performance model that is used to modify the suggestions list, thereby refining the output of the creative type model based on how prior advertisers reacted to past suggestions.

Figure 2:
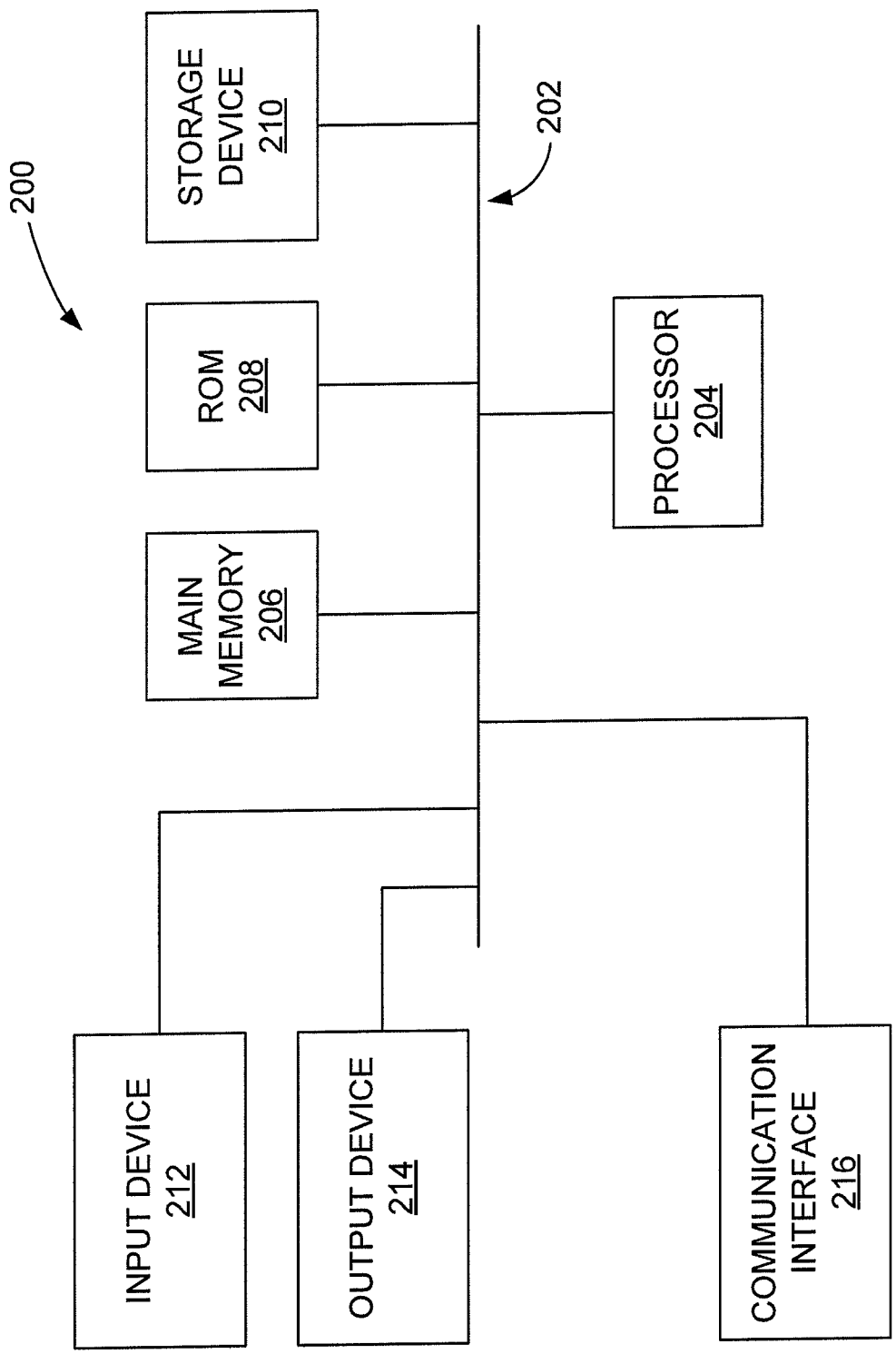

FIG. 2 is a block diagram of a computing device 200 used for suggesting creative types to a user as shown in FIG. 1. In the example embodiment, computing device could be any of the computing devices shown in FIG. 1, such as, for example, user access device 108 (shown in FIG. 1), CMS 106, or suggestion system 118 (shown in FIG. 1). FIG. 2 shows an example of a computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, tablet computers, and other similar computing devices that could be used for displaying publications to a user. The components shown here, their connections and relationships, and their functions, are meant to be examples only, and are not meant to limit implementations of the subject matter described and/or claimed in this document.

In the example embodiment, computing device 200 could be user access device 108 or any of data processing devices 112, 114, or 116 (shown in FIG. 1), wherein it is specifically configured to perform one or more of the steps described herein. In the example embodiment, computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a graphical user interface (GUI) on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system). In some embodiments, processor 204 is transformed into a special purpose microprocessor by executing computer-executable instructions or by otherwise being programmed.

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or cloud-based storage or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates the generation of models and creative type suggestions. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in FIG. 1. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, Wi-Fi, or other such transceiver (not shown). In addition, a GPS (Global Positioning system) receiver module may provide additional navigation- and location-related wireless data to device 200, which may be used as appropriate by applications running on device 200. Further, computing device 200 may include additional devices such as an accelerometer, a compass, a microphone, a camera, and a video and/or audio recorder.

Computing device 200 may also communicate audibly using an audio codec, which may receive spoken information from a user and convert it to usable digital information. The audio codec may likewise generate audible sound for a user, such as through a speaker, e.g., in a handset of device. Such sound may include sound from voice telephone calls, may include recorded sound (e.g., voice messages, music files, etc.) and may also include sound generated by applications operating on computing device 200.

Computing device 200 may be implemented in a number of different forms. For example, it may be implemented as a cellular telephone, or as part of a smart phone, personal digital assistant, a computer tablet, or other similar mobile device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 200) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing device 200 is configured to train models and generate creative type suggestions for content providers 102 (shown in FIG. 1). In some embodiments, computing device 200 is similar to suggestion system 118 (shown in FIG. 1). Content providers 102 interact with computing device 200 through, for example, a GUI provided by CMS 106 for configuring ad campaigns and associated ad creatives.

Figure 3:
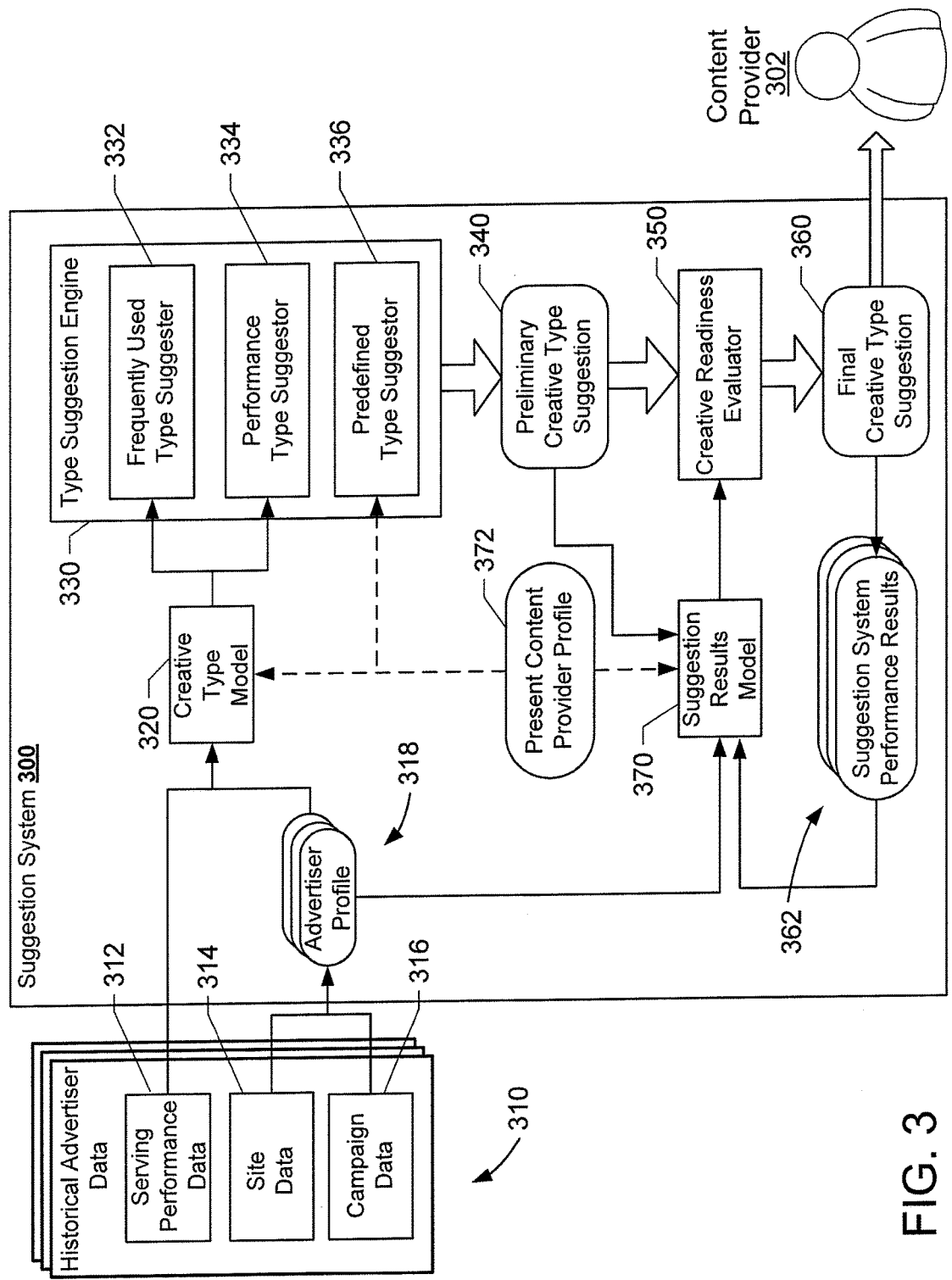

FIG. 3 is a diagram of an example suggestion system 300 for providing creative type suggestions to a content provider 102. In some embodiments, suggestion system 300 may be similar to CMS 106 and/or suggestions system 118 (both shown in FIG. 1), may be implemented on computing device 200 (shown in FIG. 2), and may be implemented in networked environment 100 (shown in FIG. 1). Suggestion system 300 may be described as performing two main functions: (a) model building and (b) type suggestion using those models. In the example embodiment, suggestion system 300 performs both functions. In other embodiments, these two functions may be performed by different systems.

With respect to the model building function, in the example embodiment, suggestion system 300 constructs, or "learns", one or more creative type models 320 from historical advertiser data 310. In some embodiments, historical advertiser data 310 may be stored in a database such as historical advertiser data 146 (shown in FIG. 1). Historical advertiser data includes serving performance data 312, site data 314, and campaign data 316.

Site data 314 includes information about an advertiser's web site (e.g., the landing page associated with the advertiser's ads). In the example embodiment, site data 314 includes a business vertical for the advertiser (e.g., one or more grouping designations, categories, and/or sub-categories). This business vertical may be used to associate similar advertisers (e.g., merchants of similar products, or products in similar areas of use). Site data 314 may also include ad assets of the advertiser, headline and description text, logo and product images, phone and location information, and video content.

Campaign data 316 includes information about the advertiser's past advertising campaigns. In the example embodiment, campaign data 316 includes spending data from past campaigns, the type of attention the campaign ad(s) were directed to (the targeting criteria, e.g., impressions, click-through's, conversions), placement information (e.g., what kind of web sites were the ads directed toward), and previously used assets. The previously used assets are the ads/creatives actually developed and/or used in past advertising campaigns, and include associated information such as the creative type of the asset. Campaign data 316 may also include cost types, placements, and demographic targeting information.

Serving performance data 312 includes information about past impressions served. Generally speaking, serving data 312 represents the results of past ad campaigns, and thus represents how the past campaigns and/or individual ads of the campaigns performed. More specifically, serving performance data 312 includes serving data of the assets referenced by campaign data 316 and, as such, represents the actual serving results of each asset. In the example embodiment, serving performance data 312 includes one or more of number of impressions, number of clicks, conversion ratio (e.g., the number of conversions divided by the number of clicks), and click through ratio (e.g., the number of clicks divided by the number of impressions).

In the example embodiment, suggestion system 300 builds an advertiser profile 318 for a plurality of advertisers. More specifically, each advertiser profile 318 is generated from the site data 314 and campaign data 316 associated with the advertiser. Suggestion system 300 builds creative type model 320 using both serving performance data 312 and the plurality of advertiser profiles 318. Model 320, in the example embodiment, is a logistic regression model learned (built) using the advertiser profiles 318 and serving performance data 312 as input variables or features. For each creative type, a model 320 is built to answer the query that, for the given advertiser's profile, whether it is suitable to use this type or not. Each creative is considered as a case. Each attribute of advertiser's profile 318 is a predictor variable. If the click-through ratio is larger than a threshold, the outcome is treated as 1, otherwise the outcome is treated as 0. In other words, models 320 are composed of sets of rules. If advertiser's profile 318 fits a rule, then that rule will influence whether the related creative type should be suggested to the advertiser or not.

During later operation, in the example embodiment, a present content provider 302 (e.g., advertiser) interacts with CMS 106 to configure a new creative (e.g., advertisement) for future presentation to users (e.g., users 150, 152, and 154, shown in FIG. 1). During a content creation or configuration process, suggestion system 300 generates or otherwise identifies a profile 372 for the present content provider 302. In some embodiments, suggestion system 300 prompts content provider 302 for profile 372 information. In other embodiments, suggestion system 300 identifies profile 372 information from historical advertiser data 310, or identifies profile 372 from advertiser profiles 318 (e.g., if the current content provider 302 is already registered as a previous advertiser).

In the example embodiment, present content provider profile 372 includes at least one or more features used to build model 320 such as, for example, a business vertical for a product or service associated with the new creative, site data for a landing page associated with the new creative, spending data associated with the new creative, a cost type desired for the new creative, or a placement desired for the new creative.

Suggestion system 300 applies present content provider profile 372 to creative type model 320 to generate creative type suggestions for content provider 302 and/or the present creative. More specifically, a type suggestion engine 330 applies profile 372 to model 320 to generate both a frequently used type suggestion 332 and a performance type suggestion 334. Further, suggestion engine 330 also uses profile 372 to generate a predefined type suggestion 336.

Frequently used type suggestion 332, in the example embodiment, is an output from model 320 that ranks creative types by frequency of use for historical advertisers similar to content provider 302 (i.e., similar to profile 372). For example, and only considering a single factor of business vertical for sake of simplicity, presume content provider 302 is a shoe manufacturer (an example business vertical). Type suggestion engine 330 generates an ordered list of creative types used by past advertisers similar to content provider 302 (e.g., past shoe manufacturers' advertisements).

Predefined type suggestion 336, in the example embodiment, represents a human component for creative type suggestion. Analysts, for example, provide suggestion system 300 with creative type suggestions for various groups of content providers 302. In one embodiment, analysts provide creative type suggestions based on business verticals. For example, suggestion system 300 may include an ordered list of creative type suggestions for shoe manufacturers. This list may be generated based on years of personal experiences working with shoe manufacturers to create ads, or based on known limitations or preferences of that particular industry. In some embodiments, predefined type suggestion 336 includes a set of weighted rules. For each rule, the conditions are the subset of attributes of the advertiser's profile, and the outcome is a certain creative type (e.g., the condition is advertiser's destination URL is a mobile app download page, and the outcome is click-to-download creative type). The weight of predefined type suggestion 336 can be set, for example, to MAX so that it has higher priority than suggestions 332 and 334.

In some embodiments, suggestions 332, 334, and 336 may include ordered lists of creative types. In other embodiments, suggestions 332, 334, and 336 may include individual values for each of a plurality of creative types representing a degree of the creative type for the given suggestion (e.g., a value for frequency of use for a particular creative type, or a value for the performance of a particular creative type).

In the example embodiment, type suggestion engine 330 weights each of suggestions 332, 334, and 336 together to generate a preliminary creative type suggestion 340. In some embodiments, each type suggestion engine 330 generates an aggregated suggestion score for each creative type. To generate this aggregated suggestion score, in some embodiments, each individual suggestion 332, 334, and 336 is weighted equally (e.g., one third each) to generate the aggregate suggestion scores. In other embodiments, each suggestion 332, 334, and 336 has an individual weight that may differ from the others and, as such, allow some to be more or less influential in generating aggregate suggestion scores. For example, each model calculates the average weight for each creative type. The results are combined for the models by adding them together. Output of suggestion 332 (averaged result) may be: [flash=0.2, youtube=0.4]. Output of suggestion 334 (averaged result) may be: [flash=0.2, html=0.3]. Output of suggestion 336 (averaged) may be: [click-to-download: 1.0]. Thus the final results are: [flash=0.4; youtube=0.4; html=0.3; click-to-download=1.0]. As such, click-to-download creative type represents the highest suggested type at this stage.

Preliminary creative type suggestion 340, in the example embodiment, is an ordered list of creative types. For example, type suggestion engine 330 may have determined that Creative Type #1 has the highest aggregate suggestion score based on the weighting of suggestions 332, 334, and 336, and Creative Type #2 has the second highest, and so on. As such, type suggestion engine 330 generates an ordered list of preliminary creative type suggestions 340. In other embodiments, preliminary creative type suggestion 340 may be a subset of creative types (e.g., only the top 3 suggested creative types), or just the single most suggested creative type (e.g., the highest aggregate suggestion score).

In the example embodiment, a creative readiness evaluator 350 performs additional post-processing analysis of the preliminary creative type suggestions 340. More specifically, suggestion system 300 analyzes and, in some embodiments, modifies preliminary creative type suggestions 340 based on the performance of past suggestions to generate a final creative type suggestion 360 for presentation to content provider 302.

During past uses, historical content providers similar to 302 were presented with creative type suggestions similar to the present final creative type suggestion 360. Those historical content providers may have chosen to adopt the creative type suggestion provided by suggestion system 300 (e.g., they may have created a new ad of that creative type), or they may have chosen not to adopt the creative type suggested (e.g., they may have abandoned creation of a new ad, or they may have chosen a creative type contrary to the suggestion). In the example embodiment, suggestion system 300 tracks these decisions as performance results 362. A successful suggestion (e.g., one that is adopted by the content provider) is referred to herein as a "save." As such, the term "save percentage" refers to a historical number of successful suggestions verses the number of total suggestions, which is one example of performance results 362.

Suggestion system 300, in the example embodiment, uses these performance results 362 along with advertiser profiles 318 to build a suggestion results model 370. Generally speaking, suggestion results model 370 is used to evaluate how well past suggestions (e.g., past final creative type suggestions 360) have been adopted. For example, if a particular creative type has been suggested in the past but has a very low adoption rate (e.g., a very low save percentage when suggesting that creative type), then that particular creative type may be a poor suggestion.

As such, suggestion system 300 modifies preliminary creative type suggestion 340 based on past suggestions (e.g., based on suggestion system performance results 362). More specifically, in the example embodiment, the inputs to suggestion results model 370 include the present content provider profile 372 (including assets set), the creative type suggestion 340, and the assets requested by the type, and the outputs are a modified suggestions list. For example, presume the output of type suggestion engine 330 (e.g., a preliminary creative type suggestion list 340) includes: [click-to-download=0.8; flash=0.5; text=0.1]. Further, presume the advertiser's profile 372 includes the following assets: product image, logo image, headline, description, and the creative types suggested by suggestion list 340 requires the following assets: click-to-download=a mobile download page; flash creative=product/logo image headline/description; and text creative=headline/description. Suggestion results model 370 determines that the present advertiser does not have one or more assets requested by click-to-download creative type and gives it a penalty factor of 0.5, which modifies the weight to 0.8*0.5=0.4. Thus the modified results in this example are: [flash=0.5; click-to-download=0.4; text=0.1].

Accordingly, during the present content provider's 302 process, creative readiness evaluator 350 modifies preliminary creative type suggestions 340 according to the output of suggestion results model 370 and generates final creative type suggestion 360 for presentation to content provider 302. In addition, as mentioned above, the actions taken by content provider 302 in relation to final creative type suggestion 360 (e.g., performance results 362) are tracked by suggestion system 300. In some embodiments, these performance results 362 are incorporated into suggestion results model 370 on a periodic basis (e.g., weekly or monthly) to update suggestion results model 370 with recent results.

Figure 4:
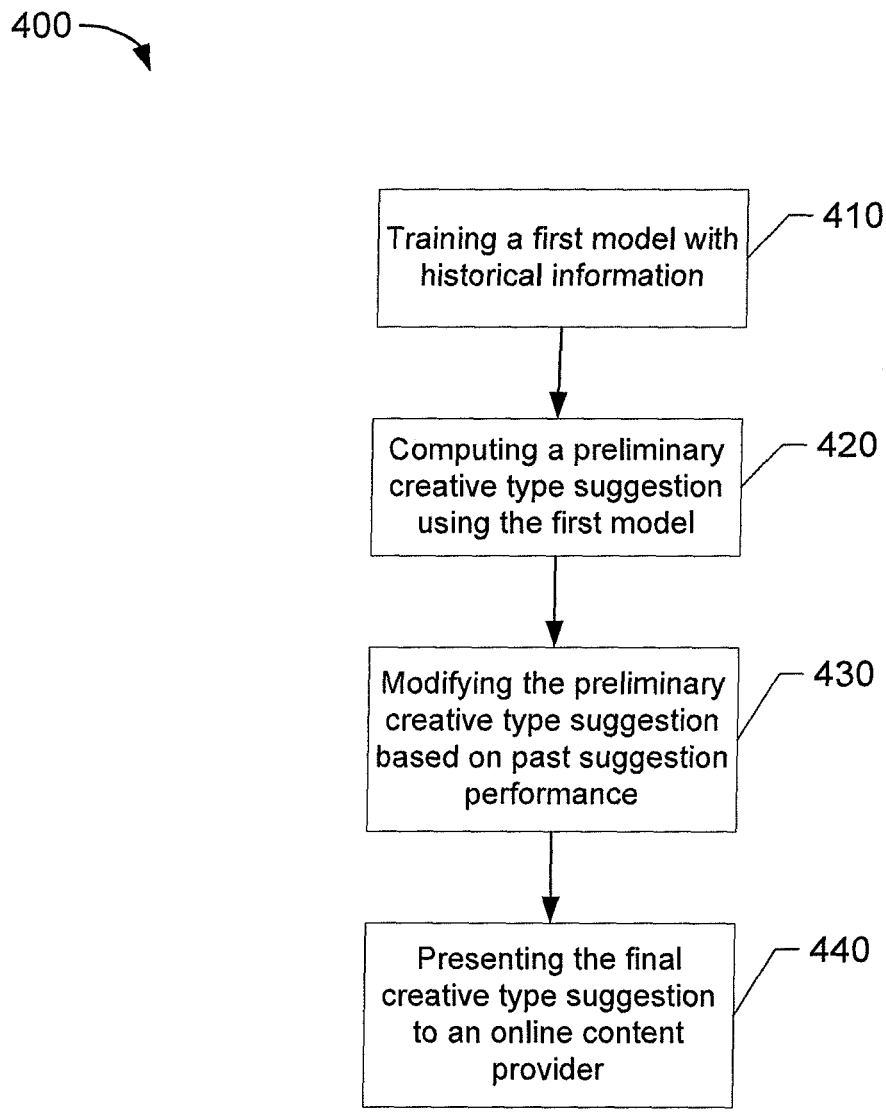

FIG. 4 is an example method 400 for suggesting creative types for online content items to an advertiser. In the example embodiment, method 400 is a computer-implemented method practiced in environment 100 (shown in FIG. 1) using one or more computing devices such as user access devices 108 (shown in FIG. 1), ad serving system 120 (shown in FIG. 1), content provider system 112 (shown in FIG. 1), publisher system 114, suggestion system 118, and/or suggestion system 300 (shown in FIG. 3). (shown in FIG. 1) and includes at least one processor and a memory. In some embodiments, method 400 includes generating an advertiser profile for each historical advertiser from a plurality of historical advertisers, thereby generating a plurality of advertiser profiles, wherein training a first model with historical information includes training the first model with at least the plurality of advertiser profiles.

In the example embodiment, method 400 includes training 410 a first model with historical information including one or more of (i) serving performance of online advertisements and (ii) advertiser information. Method 400 also includes computing 420 a preliminary creative type suggestion using at least the first model. In some embodiments, computing 420 a preliminary creative type suggestion further includes generating, using the model, one or more of a frequency of use factor and a performance factor associated with creative types. In some embodiments, computing 420 a preliminary creative type suggestion further includes weighting two or more of a frequency of use factor, a performance factor, and a pre-defined type suggestion to generate the preliminary creative type suggestion.

In the example embodiment, method 400 includes modifying 430 the preliminary creative type suggestion based at least in part on past suggestion performance to generate a final creative type suggestion. In some embodiments, the preliminary creative type suggestion includes a plurality of creative types and associated suggestion values, and modifying 430 the preliminary creative type suggestion includes modifying the suggestion values.

In some embodiments, method 400 includes training a second model with the past suggestion performance including one or more of creative type suggestion performance data and advertiser information. Modifying 430 the preliminary creative type suggestion includes modifying the preliminary creative type suggestion based at least in part on output from the second model. In some embodiments, training a second model with historical information further includes training the second model with the plurality of advertiser profiles. In the example embodiment, method 400 includes presenting 440 the final creative type suggestion to the online advertiser.

Figure 5:
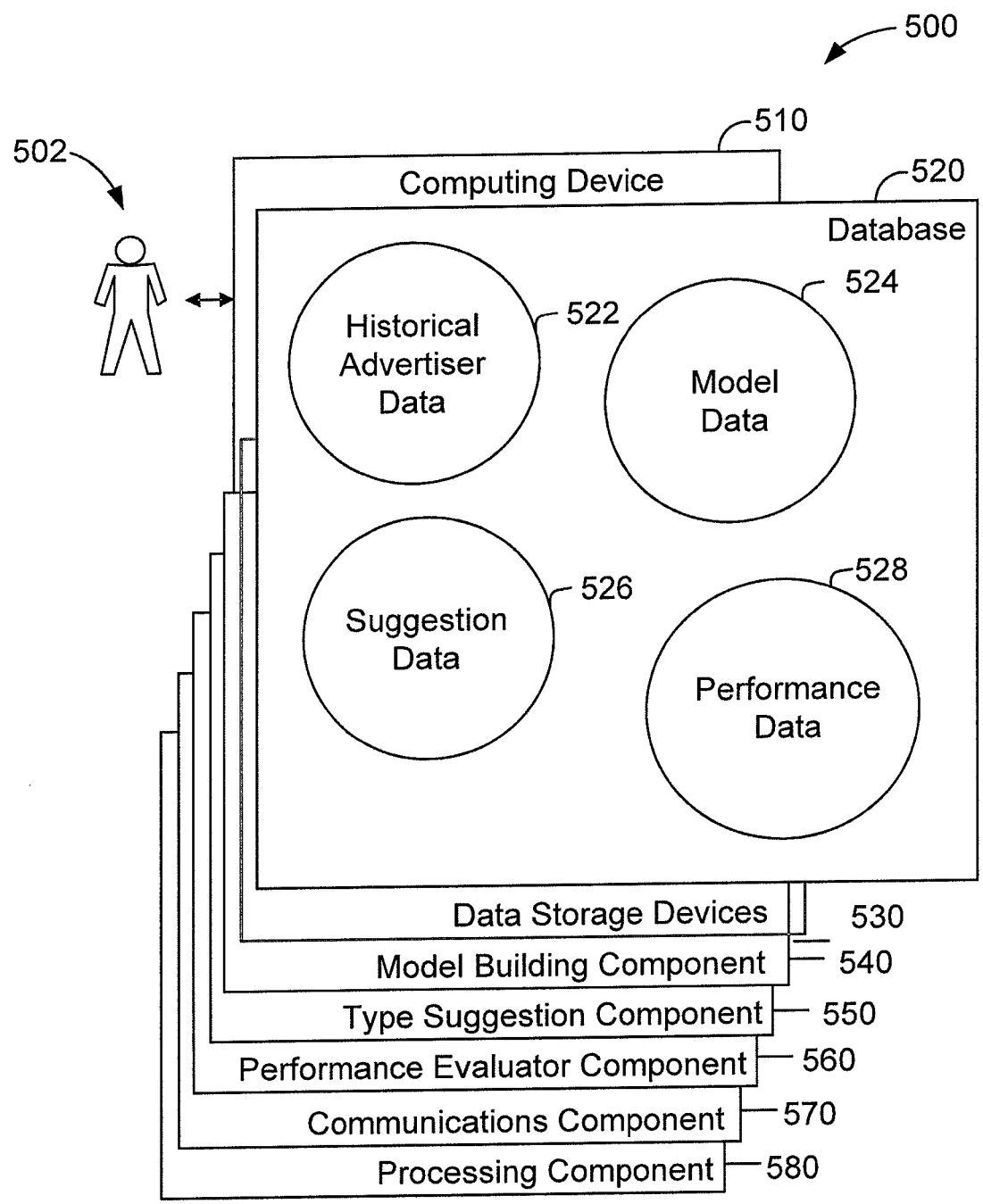

FIG. 5 shows an example configuration 500 of a database 520 within a computing device 510, along with other related computing components, that may be used to suggest creative types for online content items to an advertiser. Computing device 510 may operate in a networked environment such as environment 100 (shown in FIG. 1). In some embodiments, computing device 510 is similar to user access devices 108 (shown in FIG. 1), ad serving system 120 (shown in FIG. 1), content provider system 112 (shown in FIG. 1), publisher system 114, suggestion system 118 (shown in FIG. 1), and/or suggestion system 300 (shown in FIG. 3). In other embodiments, database 520 may be files cached on a local storage device, such as memory or disk storage. Database 520 is coupled to several separate components within computing device 510, which perform specific tasks.

In the example embodiment, database 520 includes historical advertiser data 522, model data 524, suggestion data 526, and performance data 528. Historical advertiser data 522 includes information associated with advertisers, advertising campaigns, and serving results. Model data 524 includes information associated with models such as creative type model 320 and suggestion results model 370 (both shown in FIG. 3). Suggestion data 526 includes data associated with creative type suggestions. Performance data 528 includes data associated with the performance of suggestion system 300, such as performance results 362 (shown in FIG. 3).

Computing device 510 includes the database 520, as well as data storage devices 530. Computing device 510 also includes a model building component 540 for generating models such as creative type model 320 and suggestion results model 370. Computing device 510 also includes a type suggestion component 550 for generating creative type suggestions and applying suggestion results models to creative type suggestions. Computing device 510 also includes a performance evaluator component 560 for creating and tracking and evaluating performance results 362 (shown in FIG. 3). A communications component 570 is also included for communicating with other servers or entities during pre-fetching and display operations. A processing component 580 assists with execution of computer-executable instructions associated with the system.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the embodiments or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" "retrieving" "receiving" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

While the disclosure has been described in terms of various specific embodiments, it will be recognized that the disclosure can be practiced with modification within the spirit and scope of the claims.

What is claimed is:

1. A computer-implemented method for generating creative type suggestions for an online content provider, said method using a computing device including a processor and a memory, said method comprising:
    training a first model using (i) historical serving performance data of online content items and (ii) online content provider information;
    determining a preliminary plurality of creative types for suggestion to the online content provider using at least the first model, each creative type of the preliminary plurality of creative types associated with one or more respective content asset types;
    training a second model using adoption rates of previously suggested creative types and the online content provider information;
    comparing, using the second model, content asset types associated with each of the preliminary plurality of creative types to content assets provided in the online content provider information;
    modifying, using the second model, the preliminary plurality of creative types for suggestion to the online content provider based on (i) the comparing of content asset types associated with each of the preliminary plurality of creative types to content assets provided in the online content provider information and (ii) adoption rates of previously suggested creative types to generate a final creative type suggestion; and
    presenting the final creative type suggestion to the online content provider.

2. The method of claim 1, wherein determining a preliminary plurality of creative types for suggestion to the online content provider further includes generating, using the first model, one or more of (i) a frequency of use factor associated with the preliminary plurality of creative types or (ii) a performance factor associated with the preliminary plurality of creative types.

3. The method of claim 1, wherein determining a preliminary plurality of creative types for suggestion to the online content provider further includes weighting two or more of a frequency of use factor, a performance factor, or a predefined creative type to generate the preliminary plurality of creative types for suggestion to the online content provider.

4. The method of claim 1, wherein the preliminary plurality of creative types for suggestion to the online content provider includes suggestion values associated with the preliminary plurality of creative types, and wherein modifying the preliminary plurality of creative types for suggestion to the online content provider includes modifying the suggestion values.

5. The method of claim 1 further comprising generating an online content provider profile for each historical online content provider from a plurality of historical online content providers, thereby generating a plurality of online content provider profiles, wherein training the second model using online content provider information further includes training the second model using the plurality of online content provider profiles.

6. The method of claim 1 further comprising generating an online content provider profile for each historical online content provider from a plurality of historical online content providers, thereby generating a plurality of online content provider profiles, wherein training the first model using the online content provider information includes training the first model using at least the plurality of online content provider profiles.

7. A computer system comprising:
an output device;
at least one memory; and
one or more processors configured to:
- train a first model using (i) historical serving performance data of online content items advertisement and (ii) online content provider information;
- determine a preliminary plurality of creative types for suggestion to an online content provider using at least the first model, each creative type of the preliminary plurality of creative types associated with one or more respective content asset types;
- train a second model using adoption rates of previously suggested creative types and the online content provider information;
- compare, using the second model, content asset types associated with each of the preliminary plurality of creative types to content assets provided in the online content provider information;
- modify, using the second model, the preliminary plurality of creative types for suggestion to the online content provider based on (i) the comparing of content asset types associated with each of the preliminary plurality of creative types to content assets provided in the online content provider information and (ii) the adoption rates of previously suggested creative types to generate a final creative type suggestion; and
- present the final creative type suggestion to the online content provider.

8. The computer system of claim 7, wherein said at least one processor is further configured to generate, using the first model, one or more of (i) a frequency of use factor associated with the preliminary plurality of creative types or (ii) a performance factor associated with the preliminary plurality of creative types.

9. The computer system of claim 7, wherein said at least one processor is further configured to weight two or more of a frequency of use factor, a performance factor, and a pre-defined creative type to generate the preliminary plurality of creative types for suggestion to the online content provider.

10. The computer system of claim 7, wherein the preliminary plurality of creative types for suggestion to the online content provider includes suggestion values associated with the preliminary plurality of creative types, and wherein modifying the preliminary plurality of creative types for suggestion to the online content provider includes changing the suggestion values.

11. The computer system of claim 7, wherein said at least one processor is further configured to:
- generate an online content provider profile for each historical online content provider from a plurality of historical online content providers, thereby generating a plurality of online content provider profiles; and
- train the second model using the plurality of online content provider profiles.

12. The computer system of claim 7, wherein said at least one processor is further configured to:
- generate an online content provider profile for each historical online content provider from a plurality of historical online content providers, thereby generating a plurality of online content provider profiles; and
- train the first model using at least the plurality of online content provider profiles.

13. Non-transitory computer-readable storage media having computer-executable instructions embodied thereon, wherein, when executed by at least one processor, the computer-executable instructions cause the at least one processor to:
- train a first model using (i) historical serving performance data of online content items and (ii) online content provider information;
- determine a preliminary plurality of creative types for suggestion to an online content provider using at least the first model, each creative type of the preliminary plurality of creative types associated with one or more respective content asset types;
- train a second model using adoption rates of previously suggested creative types and the online content provider information;
- compare, using the second model, content asset types associated with each of the preliminary plurality of creative types to content assets provided in the online content provider information;
- modify, using the second model, the preliminary plurality of creative types for suggestion to the online content provider based on (i) the comparing of content asset types associated with each of the preliminary plurality of creative types to content assets provided in the online content provider information and (ii) the adoption rates of previously suggested creative types to generate a final creative type suggestion; and
- present the final creative type suggestion to the online content provider.

14. The computer program product of claim 13, wherein the computer-executable instructions further cause the at least one processor to generate, using the first model, one or more of (i) a frequency of use factor associated with the preliminary plurality of creative types or (ii) a performance factor associated with the preliminary plurality of creative types.

15. The computer program product of claim 13, wherein the computer-executable instructions further cause the at least one processor to weight two or more of a frequency of use factor, a performance factor, or a pre-defined type suggestion to generate the preliminary plurality of creative types for suggestion to the online content provider.

16. The computer program product of claim 13, wherein the preliminary plurality of creative types for suggestion to the online content provider includes suggestion values associated with the preliminary plurality of creative types, and wherein modifying the preliminary plurality of creative types for suggestion to online content provider includes changing the suggestion values.

17. The computer program product of claim 13, wherein the computer-executable instructions further cause the at least one processor to:
- generate an online content provider profile for each historical online content provider from a plurality of historical online content providers, thereby generating a plurality of online content provider profiles; and
- train the second model with the plurality of online content provider profiles.

18. The computer program product of claim 13, wherein the computer-executable instructions further cause the at least one processor to generate an online content provider profile for each historical online content provider from a plurality of historical online content providers, thereby generating a plurality of online content provider profiles, and wherein training the first model using the online content provider information includes training the first model using at least the plurality of online content provider profiles.

* * * * *